Figure 1:
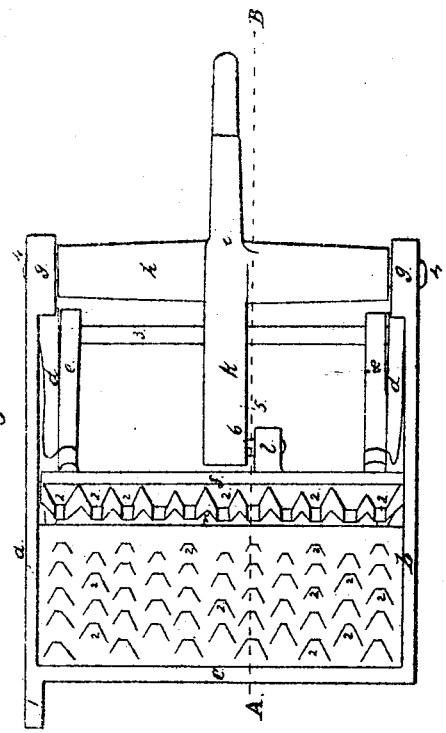

Hobbs & Brown
Ice Crushers,
Nº 6,690.   Patented Sept. 4, 1840.

Witnesses.
W. Serrell
Lemuel W. Serrell

Inventors.
Alfred C. Hobbs
John Brown

UNITED STATES PATENT OFFICE.

ALFRED C. HOBBS AND JOHN BROWN, OF NEW YORK, N. Y.

MACHINE FOR CRUSHING ICE.

Specification of Letters Patent No. 6,690, dated September 4, 1849.

*To all whom it may concern:*

Be it known that we, ALFRED C. HOBBS and JOHN BROWN, both of the city of New York, machinists, have invented and made and applied to use certain new and useful improvements in the application and combination of well-known mechanical means for the purpose of crushing ice to be used in packing refrigerators or for domestic, culinary, or other purposes, for which improvements we seek Letters Patent of the United States.

Our said improvements consist in applying a hopper, with one diagonal fixed side, and two parallel sides, to contain the ice, and compressing the ice by a movable fourth side, the fixed diagonal side, and moving side, having within them, dental projections cut or cast on, to operate downward, and prevent the ice rising in the hopper, when compressed, and also enter and split the ice, and the combination with these parts of a lever, fitted with an eccentric or cam formed point, the power of which lever is greatest, at commencing the compression, when the mass of ice offers the greatest resistance, and the point, or center, supporting the moving side of the hopper, being set away from the vertical line forming the common center of the hopper, the motion, given by the lever, brings the moving diagonal side nearer to a parallel line with the fixed diagonal, and compresses the ice between them, so as to crush it, precisely in the manner that it would be crushed between the teeth in the jaws of a living animal. This mode of constructing and operating an ice crusher, is fully and substantially described, in the following specification, and shown in the accompanying drawing, wherein—The lower Figure 1, is a plan of the machine, as made by us, with the movable jaw shown as placed nearly perpendicular, by the action of the lever; the upper Fig. 2, is a vertical section of the machine, as through the line A, B, of Fig. 1, with the movable jaw wide open as when commencing to crush the ice; the same letters and numbers as marks of reference applying to the like parts in both figures.

*a*, is a vertical metal side, with lugs 1, 1, having holes through which the machine is to be screwed up against a post, or in any convenient position for use; *b*, is the opposite side, *c*, is the fixed diagonal side forming one crushing jaw; these three sides, *a*, *b*, and *c*, are cast or wrought in one mass. The sides *a*, and *b*, are prolonged downward to form two crooked hangers or standards *d*, *d*, having through and between them a bolt 3, that connects them and forms a shaft taking the lower and outer parts of the arms *e*, *e*, which are curved upward and terminate as a movable crushing platen or jaw *f*. On the inner faces of the jaws *c*, and *f*, are dental projections 2, 2, so made with the jaws that their points take or operate downward preventing the ice from rising when compressed.

Figure 2:
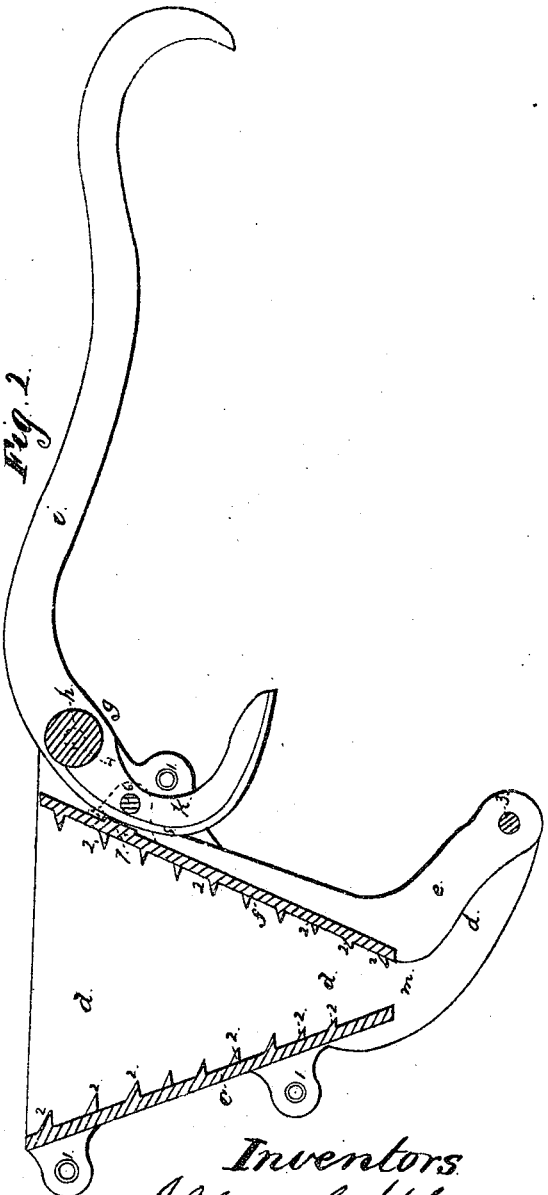

At *g*, on each side piece *a*, and *b*, is a lug or ear taking the journals 4, of a cross shaft *h*, that carries a lever *i*, this is prolonged beyond the shaft *g*, and curved downward in a cam formed point *k*, as shown in Fig. 2, the side of this seen in the drawing has on the upper part a rib 5, that takes behind the point of a pin 6, which is put through an ear or lug *l*, on the back of the jaws *f*, the lug *l*, and pin 6, are shown full in Fig. 1, and by dotted lines in Fig. 2. A small anvil piece 7, is made with the jaws *f*, to lie beneath and take the pressure and wear of the lever point *k*. By reference to the commencement hereof it will be seen and understood that when the hopper is filled with a mass or masses of ice the power of the lever *i*, is greatest at the commencement to press on the largest masses and in depressing the lever *i*, the ice which would slide up is arrested by the dental projections or teeth 2, so that it can not escape from the compression which acting to force the moving jaw nearer to a parallel line with the standing jaw and the teeth 2, 2, enter the lumps of ice splitting and breaking them ready for the crushing operations of the jaws themselves; this reduces the ice into pieces small enough to pass out at the lower opening *m*, the operation of the moving jaw *f*, being inward and downward, both crushes and draws the ice down so that it falls out into any convenient reservoir for use as before stated. On raising the lever the rib 5, acting under the pin 6, draws back the moving jaws and at the same time permits the crushed ice to fall out at the opening *m*, and allows the induction of another mass thereby effecting the work with a saving of time and labor over any other mode we know of by an operation precisely similar to that effected by the teeth and jaws of a living animal.

All or nearly all the parts used herein are in previous use in various ways in other machinery, therefore we do not claim separately any thereof as new or as our invention, but We do claim as new and desire to secure by Letters Patent—

The application of a dental faced crushing side $f$, to a hopper, such face being movable in a center eccentric with the body of the machine, such application being made in combination with a cam pointed lever formed as described and shown when such application and combination is used for the purpose of crushing and pushing out the ice, by the same movement which crushes it, and while crushing, presses hardest, while the mass of ice is strongest, the whole operating substantially as described and shown.

In witness whereof we have hereunto set our signatures this fifteenth day of June, one thousand eight hundred and forty-nine.

ALFRED C. HOBBS.
JOHN BROWN.

Witnesses:
WM. TERRELL,
LEMUEL W. TERRELL.